US009623407B2

(12) United States Patent
Delamarche et al.

(10) Patent No.: US 9,623,407 B2
(45) Date of Patent: Apr. 18, 2017

(54) MICROFLUIDIC DEVICE WITH LONGITUDINAL AND TRANSVERSE LIQUID BARRIERS FOR TRANSVERSE FLOW MIXING

(71) Applicant: International Business Machines Corporation, Armonk, NY (US)

(72) Inventors: Emmanuel Delamarche, Thalwil (CH); Onur Gökce, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 14/671,097

(22) Filed: Mar. 27, 2015

(65) Prior Publication Data

US 2016/0279632 A1 Sep. 29, 2016

(51) Int. Cl.
*B01L 99/00* (2010.01)
*G01N 1/10* (2006.01)
(Continued)

(52) U.S. Cl.
CPC ..... *B01L 3/502715* (2013.01); *B01L 3/50273* (2013.01); *B01F 1/00* (2013.01);
(Continued)

(58) Field of Classification Search
CPC ................................................ B01L 2200/027
See application file for complete search history.

(56) References Cited

U.S. PATENT DOCUMENTS 6,905,882 B2 6/2005 Buechler
7,837,379 B2 11/2010 Fiering et al.
(Continued)

FOREIGN PATENT DOCUMENTS

CN 102016595 A 4/2011
WO 2007096730 A1 8/2007
WO 2014062719 A2 4/2014

OTHER PUBLICATIONS

International Search Report and Written Opinion, International Application No. PCT/IB2015/054512, International Filing Date Jun. 15, 2015, 12 pages.
(Continued)

*Primary Examiner* — Paul Hyun
(74) *Attorney, Agent, or Firm* — Nolan M. Lawrence

(57) ABSTRACT

A microfluidic device including one or more microchannels. Each microchannel comprising: a microchannel portion with a longitudinal liquid barrier that defines first and second regions. The device includes one or more first liquid passages at the level of the longitudinal barrier. A liquid inlet allows liquid to enter the first region and a liquid outlet allows liquid to leave the microchannel portion. A transverse liquid barrier between the microchannel portion and the liquid outlet holds liquid in the first region. The device includes one or more second liquid passages at the level of the transverse liquid barrier. A liquid pump displaces liquid through a microchannel portion. The first liquid passages allow excess liquid in the first region to flow into the second region, transversally to the longitudinal barrier. The second liquid passages allow excess liquid in the longitudinal portion to be discharged via the liquid outlet.

21 Claims, 7 Drawing Sheets

(51) Int. Cl.
*B01L 3/00* (2006.01)
*B01F 1/00* (2006.01)

(52) U.S. Cl.
CPC . *B01L 2200/027* (2013.01); *B01L 2200/0684* (2013.01); *B01L 2200/16* (2013.01); *B01L 2300/089* (2013.01); *B01L 2300/0851* (2013.01); *B01L 2300/0867* (2013.01); *B01L 2300/161* (2013.01); *B01L 2400/0487* (2013.01); *B01L 2400/06* (2013.01); *B01L 2400/086* (2013.01)

(56) References Cited

U.S. PATENT DOCUMENTS

| | | | |
|---|---|---|---|
| 8,563,325 B1 | 10/2013 | Bartsch et al. | |
| 8,691,010 B2 | 4/2014 | Hansen et al. | |
| 8,889,085 B2 | 11/2014 | Lee et al. | |
| 2002/0086436 A1* | 7/2002 | Buechler | B01L 3/502746 436/164 |
| 2009/0155925 A1 | 6/2009 | Boehm | |
| 2009/0325276 A1* | 12/2009 | Battrell | B01F 11/0071 1/71 |
| 2014/0347953 A1 | 11/2014 | Hansen et al. | |

OTHER PUBLICATIONS

Brennich, et al., "Tracking reactions in microflow," Microfluid Nanofluid, Published online 2013, vol. 16, Issue 1-2, pp. 39-45, Springer Berlin Heidelberg, © Springer International Publishing AG DOI: 10.1007/s10404-013-1212-y.

Chen, et al., "Optimal Designs of Staggered Dean Vortex Micromixers," International Journal of Molecular Sciences, 2011, pp. 3500-3524, DOI:10.3390/ijms12063500, ISSN 1422-0067, www.mdpi.com/journal/ijms.

Hitzbleck, et al., "Controlled release of reagents in capillary-driven microfluidics using reagent integrators," Lab on a Chip, 2011, pp. 2680-2685, © The Royal Society of Chemistry 2011, DOI: 10.1039/c1lc20282k, www.rsc.org/loc.

Stroock, et al., "Chaotic Mixer for Microchannels," Science Magazine, Jan. 2002, pp. 647-651, vol. 295, www.sciencemag.org.

Unknown, "Product Insert BNP Test for rapid quantification of B-type natriuretic peptide (BNP)," Biosite, 2007, 37 pages, Triage® BNP Test, 22342en Rev. F, San Diego, CA, © 2007 Biosite Incorporated.

* cited by examiner

MICROFLUIDIC DEVICE WITH LONGITUDINAL AND TRANSVERSE LIQUID BARRIERS FOR TRANSVERSE FLOW MIXING

FIELD

Embodiments of the invention relate in general to the field of microfluidics and microfluidic devices, and in particular to microfluidic devices designed for flow mixing.

BACKGROUND

Microfluidics generally refers to microfabricated devices, which are used for pumping, sampling, mixing, analyzing and dosing liquids. Prominent features thereof originate from the peculiar behavior that liquids exhibit at the micrometer length scale. Flow of liquids in microfluidics is typically laminar. Volumes well below one nanoliter can be reached by fabricating structures with lateral dimensions in the micrometer range. Reactions that are limited at large scales (by diffusion of reactants) can be accelerated. Finally, parallel streams of liquids can possibly be accurately and reproducibility controlled, allowing for chemical reactions and gradients to be made at liquid/liquid and liquid/solid interfaces. Microfluidics are accordingly used for various applications in life sciences.

Many microfluidic devices have user chip interfaces and closed flowpaths. Closed flowpaths facilitate the integration of functional elements (e.g., heaters, mixers, pumps, UV detector, valves, etc.) into one device while minimizing problems related to leaks and evaporation.

The analysis of liquid samples often requires a series of steps (e.g., filtration, dissolution of reagents, heating, washing, reading of signal, etc.). For portable diagnostic devices, this requires accurate flow control using various pumping and valve principles.

For many applications (diagnostics, etc.), reagents need to be integrated inside the microfluidic chips. Unfortunately, the dissolution and mixing of reagents inside microfluidics are often challenging and difficult to control and/or optimize. In microfluidics, laminar flow in a microchannel tends to dissolve reagents extremely fast and efficiently, which causes dissolved reagents to concentrate in a small volume of liquid. These reagents might therefore be too concentrated and/or present in an insufficiently large volume of liquid. Thus, a few mixing concepts have been introduced, mostly for mixing reagents along the width of microchannels, using e.g., active elements (valves, microstirrers, electrokinetic mixers, electroacoustic principles, recirculation of liquid and reagents in circular chambers, etc.). Such approaches, however, require external controllers and peripherals, interconnects to microfluidic chips (e.g., for pneumatic, electrical, and/or mechanical actuation) and, more generally, add complexity to the design, fabrication and packaging of microfluidic devices, which in turn raises costs of fabrication, makes microfluidic devices significantly more complicated to use, and the microfluidic device and peripherals bulkier and less portable.

SUMMARY

According to a first aspect of the present invention, a microfluidic device comprises a set of one or more microchannels, each comprising: a microchannel portion, i.e., a chamber, with a longitudinal liquid barrier extending longitudinally therein, thereby defining a first region and a second region in the microchannel portion; one or more first liquid passages, at the level of the longitudinal barrier; a liquid inlet, which is preferably on a first side of the microchannel portion, configured to allow liquid to enter the first region; a liquid outlet, which is preferably on a second side of the microchannel portion opposite to the first side, configured to allow liquid to leave the microchannel portion; a transverse liquid barrier arranged between the microchannel portion and the liquid outlet to hold liquid flowed from the liquid inlet in the first region, in operation; and one or more second liquid passages at the level of the transverse liquid barrier, the device further comprising a liquid pump configured to displace liquid through each microchannel portion of the set of one or more microchannels. The one or more first liquid passages are furthermore configured so as to allow, in operation, excess liquid in the first region to flow into the second region, transversally to the longitudinal barrier, and the one or more second liquid passages are configured so as to allow, in operation, excess liquid in the longitudinal portion to be discharged via the liquid outlet.

Such a device allows an "orthogonal" flow mixing, i.e., excess liquid flows into the second region, transversally to the longitudinal barrier, which helps to distribute the liquid without a continuous bulk flow. When reagents are present in the second region, the reagents shall start to dissolve as the liquid transversally flows into the second region but the reagents can stay local and gently dissolve around in a simple, passive, reliable and predictable manner. Such a device may benefit from various embodiments and variants, which provide additional advantages, as summarized below.

In embodiments, the above device may further comprise an air vent connecting to the second region and configured so as to evacuate air therefrom, when liquid fills the second region, in operation. Therefore, liquid can smoothly enter the second region, without having to compress air to fill this region.

Preferably, the air vent connects the second region to the liquid outlet, i.e., downstream from the transverse barrier, such that no additional air exit need be provided. In addition, the air vent can be made longitudinal and essentially parallel to the microfluidic portion, such that the obtained designed has a small footprint and is easily multiplexable.

In preferred embodiments, the air vent connects the second region at a location close enough to the liquid inlet for the air vent to be able to evacuate air from the microchannel portion, even when liquid has substantially filled the second region, in operation. The closer to the liquid inlet, the more liquid can enter the second region without having to compress air to fill it.

Preferably, the air vent connects to the second region via a delay chamber, the latter configured so as to be fillable by excess liquid supplied via the liquid inlet after the microchannel portion has been filled with liquid, in operation. The delay chamber is typically made wider than the air vent. Because of the time needed for liquid to fill the delay chamber (after it has filled the microchannel portion), additional time is given for diffusion of reagents before excess liquid flows through the outlet.

In embodiments, the air vent comprises an air permeable liquid barrier, configured for blocking a liquid entering the air vent. This way, liquid may not (or only partly) enter the air vent (e.g., via a delay chamber), while air can still be evacuated. Providing an air permeable liquid barrier in the air vent is of particular advantage when the air vent connects to the second region via a delay chamber, because in that case the additional time given for reagent diffusion can be more precisely estimated.

Preferably, the longitudinal liquid barrier comprises one of: an elongated, raised structure protruding from a bottom wall of the microchannel portion, whose height is less than a depth of the microchannel portion, thereby defining a liquid passage above the raised structure, allowing an excess liquid in the first region to flow from the first region to the second region, in operation; a set of aligned, raised structures, each protruding from a bottom wall of the microchannel portion, wherein a space between two consecutive structures of the set forms a capillary liquid passage, the latter allowing pressurized liquid in the first region to flow to the second region, in operation; a monobloc, raised structure, protruding from a bottom wall of the microchannel portion, and exhibiting crenels that form liquid passages, which allow pressurized liquid in the first region to flow from the first region to the second region, in operation; a set of one or more recesses, each provided in a thickness of a bottom wall of the microchannel portion, and allowing pressurized liquid in the first region to flow from the first region to the second region, in operation; and a non-wetting surface.

In preferred embodiments, the transverse liquid barrier is at a capillary distance from the longitudinal structure, so as to prompt excess liquid in the first region to flow into the second region rather than exit the microchannel portion via the one or more second liquid passages.

Preferably, the transverse liquid barrier extends perpendicularly to the longitudinal liquid barrier.

In embodiments, the longitudinal liquid barrier extends longitudinally and across substantially a whole length of the microchannel portion and the transverse liquid barrier extends transversally and across substantially a whole width of the microchannel portion, between the longitudinal liquid barrier and the liquid outlet.

Preferably, the liquid pump includes active liquid pumping means, as these happen to work extremely well in the above devices, in practice. Satisfactory results were nevertheless obtained with passive capillary pumps.

In preferred embodiments, the second region comprises reagents, which are dilutable by liquid flowing from the first region into the second region, in operation.

In "multiplex" embodiments, the set of one or more microchannels comprises at least two microchannels, which are arranged in a multiplexed fashion.

Preferably, the device then comprises a liquid synchronization junction downstream from each of said two or more microchannels, configured to synchronize flows of liquid conveyed in said two or more microchannels, downstream from respective microchannel portions thereof, wherein the synchronization junction comprises one or more liquid barriers, extending longitudinally therein, arranged to delay propagation of liquid entering the synchronization junction.

Preferably, in embodiments of present devices, a transverse section of the liquid outlet is smaller than a transverse section of said microchannel portion and this, for one or more of, or even each of the microchannels of the set. This further improves lateral mixing.

Most simple is to fabricate the transverse liquid barrier as a raised structure. For instance, each of the transverse and longitudinal liquid barriers may be provided as raised structures, e.g., like a rail.

In variants, embodiments of the present devices comprise a liquid diversion valve and the transverse liquid barrier can form part of this valve. For example, the transverse barrier can be formed by tapered wall, which otherwise form a liquid constriction.

According to other aspects, embodiments of the invention can be a microfluidic device combining several of the features discussed above. For instance, such a device may comprise a set of one or more microchannels, each comprising: a microchannel portion with a longitudinal liquid barrier extending longitudinally therein, thereby defining a first region and a second region in the microchannel portion; one or more first liquid passages, at the level of the longitudinal barrier; a liquid inlet on a first side of the microchannel portion, configured to allow liquid to enter the first region; a liquid outlet on a second side of the microchannel portion, opposite to the first side, configured to allow liquid to leave the microchannel portion; a transverse liquid barrier arranged between the microchannel portion and the liquid outlet to hold liquid flowed from the liquid inlet in the first region, in operation; and one or more second liquid passages at the level of the transverse liquid barrier. The device further comprises a liquid pump, configured to displace liquid through each microchannel portion of the set of one or more microchannels. Just as before, the one or more first liquid passages are configured so as to allow, in operation, excess liquid in the first region to flow into the second region, transversally to the longitudinal barrier, and the one or more second liquid passages are configured so as to allow, in operation, excess liquid in the longitudinal portion to be discharged via the liquid outlet. In addition, the transverse liquid barrier is located at a capillary distance from the longitudinal structure, so as to prompt excess liquid in the first region to flow into the second region rather than exit the microchannel portion via the one or more second liquid passages. In more detail, the transversal liquid barrier can for instance be located close enough to an end of the longitudinal barrier, to allow for a liquid meniscus to form in the gap and pin the liquid, when the latter fills the first region. Excess liquid will next be prompted to flow through, e.g., above the longitudinal barrier, rather than via the gap, where the liquid is pinned.

Preferably, such a device comprises an air vent connecting the second region to the liquid outlet and configured so as to evacuate air therefrom, when liquid fills the second region, in operation, as explained above. Advantageously, the air vent may connect the second region at a location close enough to the liquid inlet for the air vent to be able to evacuate air from the microchannel portion when liquid has substantially filled the second region, in operation.

According to another aspect, embodiments of the invention can be a method for controlling liquid in any of the microfluidic devices described above, and their variants, the method comprising: letting liquid enter the first region of the microchannel portion via the liquid inlet, thanks to said liquid pump; letting liquid that has entered the first region fill the first region, the liquid being held by the transverse liquid barrier; letting excess liquid in the first region flow into the second region, transversally to the longitudinal barrier, via the one or more first passages; and letting excess liquid in the longitudinal portion discharge into the liquid outlet, via the one or more second passages.

In embodiments, the device is configured such that, at the step of letting excess liquid in the first region flow into the second region, excess liquid flows into the second region transversally to the longitudinal barrier so as to fill the second region from a second side of the microchannel portion, near the liquid outlet, to a first side of the microchannel portion, near the liquid inlet.

Preferably, the second region comprises reagents, the latter dilutable by excess liquid flowing from the first region into the second region, such that letting excess liquid flow into the second region via the one or more first liquid passages causes to dissolve the reagents.

For instance, the second region comprises reagents of different types, the latter spotted in one or more of the following ways: a reagent of a second type is spotted on top of a reagent of a first type; and a reagent of a first type is spotted in a first area of the second region and a reagent of a second type is spotted in a second area of the second region, said first and the second areas extending, in-line, along the longitudinal barrier.

Preferably, at least one microchannel of said set of one or more microchannels further comprises one or more receptors downstream from the liquid outlet, such that excess liquid discharging into the liquid outlet will react with said one or more receptors.

The above devices and methods can accommodate a number of variants and be combined in many different ways. For example, the transverse liquid barrier may be formed by transverse end walls, while the longitudinal barrier can be provided as a groove, a non-wetting surface or, still, as a castellated structure. Several air vents could be provided, connecting the second region at different locations. The second region can be structured, e.g., according to the number of air vents connecting thereto. The channels may be given sophisticated patterns, especially in multiplex embodiments, to adapt the time necessary for liquids to flow therein. Pumps may be provided upstream and/or downstream from the mixing zone (i.e., referred to as microchannel portion above), etc.

Several devices and methods embodying the present invention will now be described, by way of non-limiting examples, and in reference to the accompanying drawings. Technical features depicted in the drawings are not necessarily to scale.

DETAILED DESCRIPTION

Figure 1:
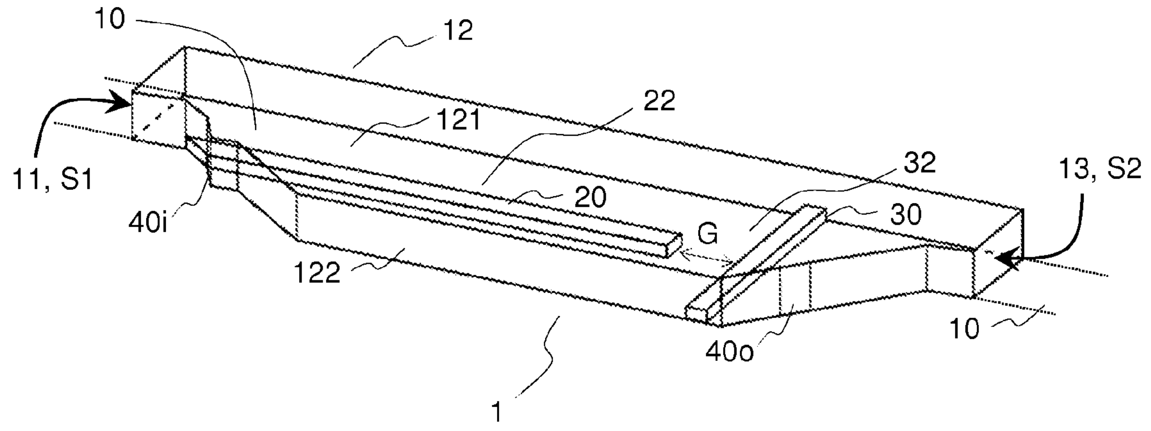
FIG. 1 is a 3D view of a simplified representation of a microfluidic device, according to embodiments. For simplicity, no air vent is depicted in this drawing.
Figure 2:
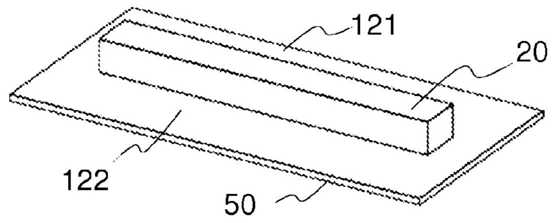
FIG. 2 is a (simplified) 3D view of the sole longitudinal liquid barrier (here embodied as a raised structure), and protruding from a bottom wall of the microchannel portion, according to various embodiments.

As the present inventors realized, dissolution of chemicals in a microfluidic channel concentrates the chemicals in a very small volume of liquid. A particularly challenging situation is the following: when the dissolution of reagents inside a microfluidic chip is so efficient and mixing so low, the effective volume of liquid containing dissolved reagents happens to be too small and thereby prevents performing assays. This problem can notably be illustrated using a food dye, which is spotted in a microchannel using an inkjet spotter. The microchannel can for example be 1000 μm wide and 100 μm deep. Water can be injected at various flow rates (for example at 0.1, 1, or 10 μL/min). The dye is typically dissolved in 0.1 to 0.2 μL of solution with a strong concentration gradient where more dye is dissolved close to the liquid filling meniscus; both the small dissolution volume and significant concentration gradient pose critical issues. For example, if the dye had as role to react with an analyte in the liquid so as to make it detectable, the small dissolution volume and variable dye concentration will lead to an inhomogeneous and imprecise signal, and the signal area will be small and challenging to monitor. In addition, the variation of the volume of liquid pumped in the microfluidic system can strongly affect the position of the reagents in the detection area. A similar problem can be observed with expensive DNA probes spotted in a microchannel as their dissolution occurs in a very small volume of solution, such that the probes are easily flushed outside the detection area.

Having realized such potential problems, the present inventors have devised a new concept of microfluidic devices, whose channels can be configured so as to create two flow components to occur in different directions. One first flow component brings a liquid in the vicinity of a surface of interest (typically where reagents may be located). The second flow component brings the liquid over that surface. In most embodiments described herein, the two flow components are orthogonal, for simplicity of the designs. Accordingly, at least some of the present concepts (these flow components, the way they dissolve and distribute reagents in a liquid) can be referred to as "orthogonal flow mixing".

In reference to FIGS. 1-18, an aspect of the invention is first described, which concerns a microfluidic device 1 comprising a set of one or more microchannels 10. One or more, or each, microchannel of the set comprises a microchannel portion 12 exhibiting a longitudinal liquid barrier 20. The microchannel portion 12 can be regarded as a mixing chamber, at least in some of the embodiments described below. The longitudinal liquid barrier 20 extends longitudinally in the portion 12. The barrier 20 is typically elongated, i.e., its largest dimension is its length, extending parallel to the channel portion, that is, parallel to the average liquid direction in the channel portion. The longitudinal barrier accordingly defines two regions in the microchannel portion, i.e., a first and a second region, respectively denoted by numeral references 121, 122. The barrier 20 is furthermore designed, in the device 1, to provide one or more first liquid passages 22, at the level of the barrier 20. In addition, a liquid inlet 11, which preferably is located on a first side S1 of the portion 12, is provided to allow liquid to enter the first region. Similarly, a liquid outlet 13 (preferably located on a second side S2 of the portion 12, that is, opposite to the first side) allows liquid to leave the microchannel portion. Next, a transverse liquid barrier 30 is arranged between the portion 12 and the liquid outlet 13, and is designed such as to hold liquid that has flowed from the liquid inlet in the first region, in operation. One or more second liquid passages 32 are provided at the level of the transverse liquid barrier 30. The device further comprises a liquid pump 15 (not shown in FIG. 1), configured to displace liquid through each microchannel portion 12 of the set of one or more microchannels 10.

The passages 22, 32 are furthermore designed so as to allow a transverse (also referred to as "orthogonal" herein) liquid flow, which shall be especially advantageous for mixing fluids and/or dissolving reagents (or any chemical species). Namely, the one or more first liquid passages 22 are configured so as to allow, in operation, excess liquid in the first region to flow into the second region, transversally to the longitudinal barrier. In addition, the one or more second liquid passages 32 are configured so as to allow, in operation, excess liquid in the longitudinal portion 12 to be discharged via the liquid outlet 13. Several types and designs of barriers 20, 30 and liquid passages 22, 32 can be contemplated, as discussed later in detail. In all cases, the liquid passage(s) 22 defined by (or at the level of) the longitudinal barrier 20 allow(s) excess liquid (e.g., an overflow of liquid or pressurized liquid held in the first region 121) to flow into the second region 122. Once it has filled the second region 122 (and hence substantially all the portion 12), excess liquid will be able to exit the longitudinal portion 12, via the passage(s) 32, in operation. How liquid enters, advances in, reroutes in and exits the portion 12 is explained in detail, in reference to FIG. 16.

Referring now to FIGS. 10-17, in embodiments, the device 1 further comprises an air vent 40, the latter connecting to the second region 122 and being configured so as to evacuate air therefrom, when liquid fills the second region, in operation. Just like the microchannels, the air vent is preferably fabricated as a groove, i.e., grooved into the thickness of a bottom wall 50 of the device, for simplicity. The various grooves can then easily be closed by a lid (see ref. 60 in FIG. 3). Thanks to the air vent, liquid can fill the second regions without being slowed down by air that is being compressed by the liquid. The air vent 40 shall for instance connect the second region 122 to the liquid outlet 13, which allows simple designs, which are easily multiplexable as the channel portion 12 (and more generally the channel 10) does not need to cross the air vent. The air vent 40 shall preferably connect the second region 122 at (or close to) an end of the portion 12, i.e., on the first side S1 thereof. In FIG. 1, only the inlet and outlet passages (or openings) 40*i*, 40*o* are depicted, illustrating how and where the air vent can be connected to the channel 10. The air vent is per se not depicted in FIG. 1, for the sake of ease of understanding. This way, the air vent connects the portion 12 in the proximity of the inlet area 11, which allows air to be evacuated even when liquid has substantially filled all the second region 122 and, if necessary, until complete filling of the second region.

Figure 11:
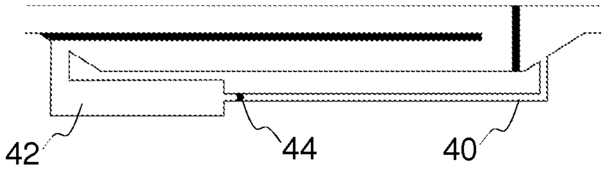
Figure 12:
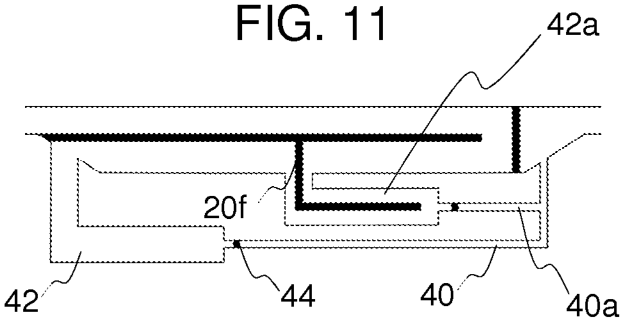

Referring now more specifically to FIGS. 11-12, in embodiments, the air vent 40 may connect to the second region 122 via a delay chamber 42, where the latter is configured so as to be fillable by excess liquid that continues to enter the microchannel portion 12 (via the liquid inlet 11) even though the second regions 122 (and therefore the whole portion 12) has now been entirely filled with liquid 12, in operation. As illustrated in FIGS. 10-14, 16, in embodiments, the air vent 40 comprises a liquid barrier 44, configured for blocking a liquid entering the air vent, while being still air permeable, so as to allow compressed air to be evacuated.

As described earlier, several types of barriers can be contemplated, as illustrated in FIGS. 2-9. Although FIGS. 2-9 specifically depict longitudinal barriers 20, the various types of barriers depicted can actually be used for each of the longitudinal liquid barrier 20, the transverse barrier 30, the air vent barrier 44, or the various barriers involved in the junction 70 (see FIGS. 17-18).

Figure 3:
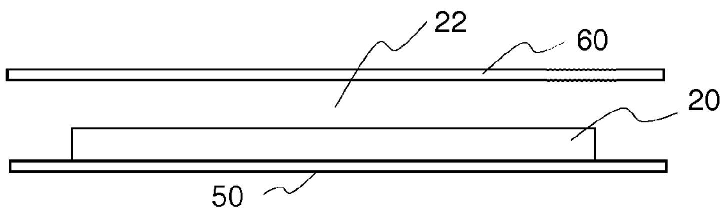
FIG. 3 is a sectional view of a device as in FIG. 2, where the device further comprises a lid (or seal), which together with the raised structure, provides an upper liquid passage (above the raised structure), according to various embodiments.

Referring back to FIGS. 2-9, the longitudinal liquid barrier 20 may for instance comprise an elongated, raised structure 20*a* (FIGS. 1-3), protruding from the bottom wall 50 of the portion 12. As depicted in FIG. 3, its height is less than a depth of the microchannel portion, so as to define (after having closed the channels) a liquid passage 22 above the raised structure 20, to allow excess liquid to flow from the first region to the second region, in operation.

Figure 4:
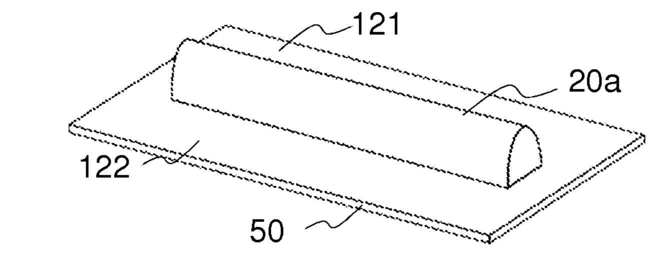
FIGS. 4-9 depict several variants of the embodiments shown in FIG. 2, involving various sorts of longitudinal rails, according to embodiments.

As illustrated in FIG. 4, the raised structure 20*a* may be given a specific profile (e.g., rounded), to facilitate liquid overflow. On the contrary, a mere rail, having a step-like transverse profile, might offer stronger pinning sites to a liquid meniscus and can therefore be more advantageous, depending on the precise circumstances of operation. The specific shapes and details of the barriers 20 (but also the barriers 30, 44, and 74, 76 used in other places of the device 1) may depend on the types of fluids used, the flow rates and, more generally, the various parameters of operation. Note that in each of the embodiments of FIGS. 1-4, excess liquid is meant to first accumulate in the first region 121 and then flow over the barrier 20, 20*a*, once a sufficient quantity (and if necessary a sufficient pressure too) of liquid has accumulated in the first region 121, to then transversally flow into the second region 122. However, many variants can be contemplated where excess liquid shall transversally flow through the barrier 20, and not necessarily over said barrier.

Figure 5:
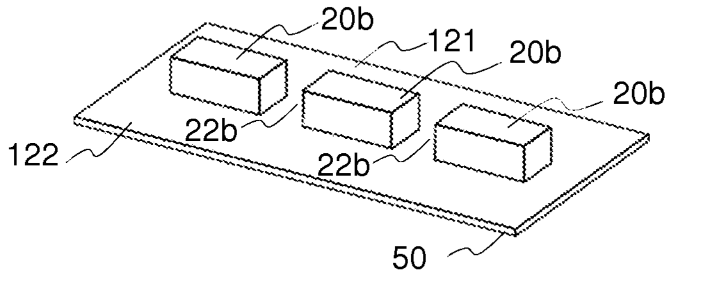

For instance, in FIG. 5, the longitudinal barrier is provided as a set of aligned, raised structures 20*b*, each protruding from the bottom wall 50 of the portion 12. Here the space 22*b* between two consecutive structures 20*b* of the set forms a capillary liquid passage, which holds the liquid until a sufficient pressure of liquid in the first region allows it to flow into the second region, through the passages 22*b*, in operation. The dimensions of the various structures 20*b* and passages 22*b* can be adapted, as needed for the present purpose.

Figure 6:
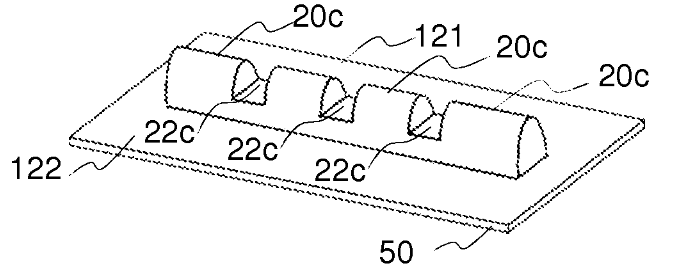

In particular, the raised structures may extend from a rail, instead of extending from the bottom wall 50, as illustrated in FIG. 6. Here, the longitudinal structure is castellated, that is, a monobloc, raised structure is provided, which protrudes from the bottom wall 50 so as to form a longitudinal socle. The structure is nevertheless castellated so as to form merlons 20*c*, which exhibit crenels 22*c* that form liquid passages. The merlons can be profiled, if necessary. The crenels still allow pressurized liquid to flow from the first region 121 to the second region 122, in operation.

When the longitudinal barrier is transversally structured so as to exhibit transverse liquid passages, such as the crenels 22*b*, 22*c* shown in FIGS. 5-6, then the height of the longitudinal barrier preferably matches the depth of the corresponding channel portion 12, such that, e.g., the merlons 20*b*, 20*c* extend up to the lid, once the channels are closed (or sealed). Accordingly, the critical parameter is the liquid pressure in that case: above a threshold pressure, liquid shall be forced through the transverse liquid passages 22*b*, 22*c*. In variants, the merlons 20*b*, 20*c* may be design so as to preserve a capillary passages above the merlons 20*b*, 20*c*, such that liquid may, above specific pressures, pass through the crenels and above the merlons.

Figure 7:
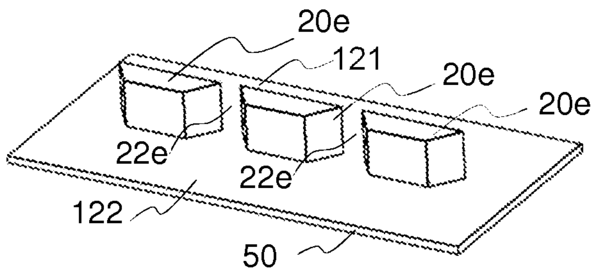

As further illustrated in FIG. 7, the raised structures 20*e* may even be transversally structured, e.g., be tapered, so as to exhibit tapered liquid passage 22*e*. Tapered liquid passage will help liquid in the second region 122 to progress toward the liquid passage(s) by adding a favorable capillary pressure component: a liquid in contact with wettable surfaces separated by a diminishing separation distance will experience an increased capillary force. Therefore, the liquid barrier exhibited in FIG. 7 is particularly appropriate in the case of a capillary-driven microfluidic device (i.e., a microfluidic device with wettable flowpath that does not need an external pump or any externally applied pressure). Indeed, the liquid in the second region 122 will more easily follow the tapered liquid passage 22*e*, connect with liquid in the first region 121, and this will result in flow of liquid in the first region 121 over the adjacent raised structure 20*e*. In other words, before the liquid in 121 goes over the raised barrier, the embodiment of FIG. 7 makes sure that the liquid in the region 122 goes toward the passages and merges with the meniscus of liquid of the first region 121 that is pinned at the passages 22*e*.

Raised structures (e.g., the structures 20*b* depicted in FIG. 5) may be fabricated using silicon wafers and standard photolithography techniques. Other substrates and corresponding fabrication methods can nevertheless be contemplated. Such substrates may for example include polymers and glass; fabrication methods can be based on various lithography techniques involving wet or dry etching steps, injection molding, hot embossing, nanoimprint lithography, laser ablation, etc. Here, we provide an example of fabrication of raised structures, where a silicon wafer is used, in which the depth of the flowpaths is 100 μm and the barriers are 33 μm high (i.e., the silicon in the barrier areas need to be etched on a depth of approximately 66 μm). In a first step, all structures except the barriers are etched on a depth of 33 μm using standard photolithography and deep reactive ion etching (DRIE). In a second step, all structures including the barriers (e.g. barriers 20, 30, 44, 72, 74, and 76) are etched on a depth of 66 μm. After this second etching step, the etch mask can be removed and the wafer can be cleaned. Surface treatments can be done on the wafer level or on the single microfluidic chip level, in which case the wafer must be diced to release individual chips. The wafer or chips can typically be made hydrophobic using silanization e.g., they are immersed into a 0.1% (v:v) solution of trichloroctylsilane in heptane for 2 min. The wafer or chips are removed and rinsed with ethanol and dried using a stream of nitrogen. Reagents and receptors can be added to the appropriate regions of the chip preferably using an inkjet spotter. Such spotters produce droplets with diameters of approximately 60 μm (i.e. approximately 100 pL). The second region 122 should therefore preferably be approximately 200 μm in width to ease the alignment of the spotter over this region and the delivery of droplets inside it with very low risks of having droplets misplaced. Spotted droplets dry very quickly once reaching the surface of the second region 122, making it possible to rapidly spot numerous droplets (e.g., 10 droplets or more in 0.1 s), if needed. Droplets or series of droplets can be deposited at various areas of the second region 122. Droplets can contain, for example, antibodies, oligonucleotides, enzymes, and many other types of reagents and chemicals. At this point, devices 1 can be sealed using for example low temperature lamination of a dry-film resist, a layer of poly(dimethyl)siloxane, or a polymer cover. Receptors can be deposited in a similar manner to reagents or can be patterned or deposited on the sealing cover. An alternative to using etching of a wafer for producing raised structures is to (1) etch all flowpaths and vents to the desired depth and (2) pattern raised structures in photoresists having the desired thickness.

Figure 8:
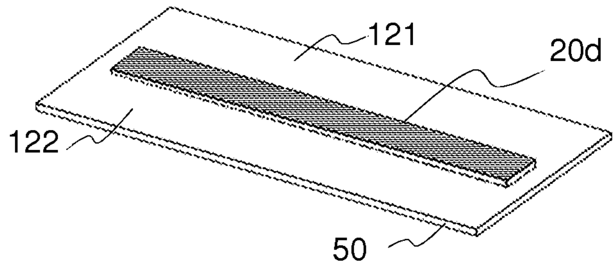

In other variants, the liquid barriers may not be provided as raised structures, but instead provided as a simple non-wetting surface 20*d*, see FIG. 8, which shall again hold liquid until a certain liquid pressure allows liquid to overcome the barrier's resistance. The surface 20*d* may for instance be flush with the bottom wall 50, as illustrated in FIG. 8, or slightly raised with respect to the wall 50, depending on the fabrication process used. The surface 20*d* can be created over the bottom wall 50 using conventional lithography and surface chemistry processes. For example, surface 20*d* can be created by patterning a 20-nm-thick gold layer and coating it with a self-assembled monolayer of alkanethiol to make the gold areas hydrophobic. Another example is to pattern hydrophobic silanes on the silicon oxide of a bottom wall 50. This can be done using photolithography or direct deposition of hydrophobic silanes using an inkjet spotter. This can also be done using a two-step reaction with the patterning of a surface functionality, which is used in a second step to anchor hydrophobic molecules.

Figure 9:
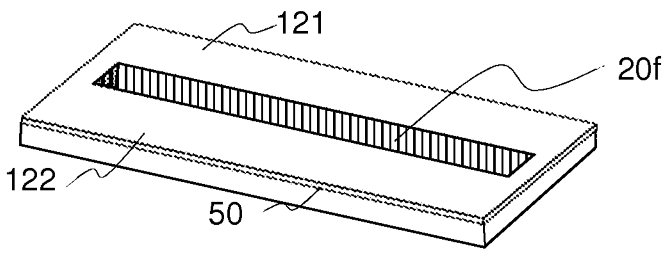
Figure 10:
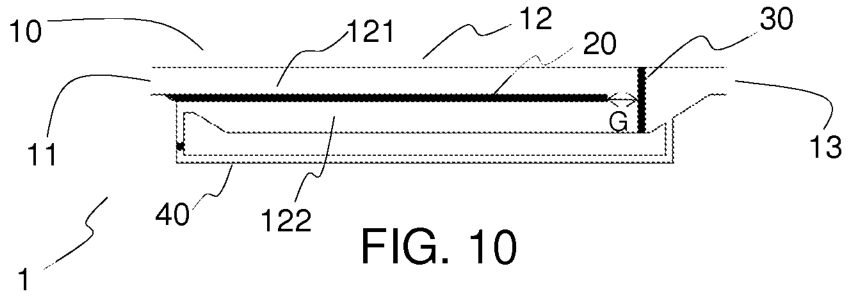
FIGS. 10-15 are top views of a simplified representations of microfluidic devices, according to distinct embodiments.

In still other variants, the longitudinal barrier may be provided as a set of one or more recesses 20*f* (but preferably one recess only, for simplicity), as shown in FIG. 9. A recess is formed in the thickness of the bottom wall 50 of the portion 12. Again, a recess creates a pinning sites for an air-liquid meniscus and therefore opposes a resistance to the liquid, which shall be overcome by a sufficiently pressurized liquid, for it to flow from the first region to the second region, in operation. If necessary, several recesses may be provided, longitudinally, so as to preserve capillary gaps in between. Recesses can provide more efficient obstacles to liquid because in order to cross a recess, the meniscus would need to stretch more than it does when it goes over a raised barrier. This increased stretching of the liquid-air meniscus will have a larger energy penalty cost, for example for liquids having substantial surface tension. These recesses may be fabricated using similar techniques as discussed above for the fabrication of the raised structures, e.g., using a Si wafer and multiple lithography and etching steps.

In general, the microchannels and the liquid barriers need not be on the same substrate. The microchannels may be fabricated on e.g., Si wafers and the liquid barriers on the lid. This can simplify fabrication, in particular because barriers can be formed on the planar surface of a lid.

Referring now to FIGS. 1 and 10-15: in embodiments, the transverse liquid barrier 30 is at a capillary distance from the longitudinal structure 20 (rather than in direct contact with it), so as to define a gap G, which prompts excess liquid in the first region to flow into the second region rather than exit the microchannel portion 12 via the second passage(s) 32. The gap should not be too large, to avoid that excess liquid flows directly into the second region 122, via the gap G, when filling the first region 121. Still, the transverse liquid barrier 30 shall be located close enough to an end of the longitudinal barrier 20, to allow for a liquid meniscus to form in the gap G and pin the liquid, when the latter fills the first region 121. Excess liquid will next be prompted to flow above the longitudinal barrier 20, rather than via the gap G because a flow through the gap G would create a higher flow resistance (i.e. the liquid would contact a larger sum of wall areas) than when the liquid directly flows over the longitudinal barrier.

As further illustrated in FIGS. 10-13, the transverse liquid barrier 30 preferably extends perpendicularly to the longitudinal liquid barrier 20, for simplicity. In variants such as depicted in FIG. 14 or 15, the transverse barrier may be directly provided by the end walls 30*a*, 30*b*, which may, if necessary, be tapered 30*b* (FIG. 15) to form a liquid constriction, and thereby hold the liquid long enough in the portion 12 before it exits the portion 12 via the liquid outlet 13.

Attention is drawn to the dimensions and shapes of the various passages 22, 32 and barriers 20, 30, 44, etc., which need to be appropriately designed (in shape and dimensions), so as to allow the particular sequence of events desired here, e.g., to allow an orthogonal flow mixing, as explained earlier. The larger the gaps, passages, opening, etc., the easier it is for liquid the flow. The dimensions (and additionally the shapes) of the various liquid passages should be designed accordingly.

Figure 13:
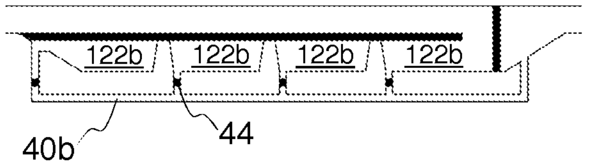
Figure 14:
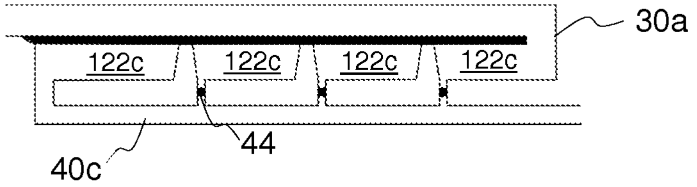
Figure 15:
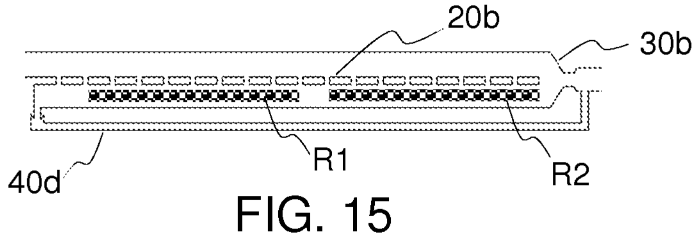

Referring now to FIGS. 1, 10-15, and 17: we note that, notwithstanding the gap G, the longitudinal liquid barrier 20 preferably extends across substantially the whole length of the portion 12. Similarly, the transverse liquid barrier 30 may extend (transversally) across substantially the whole width of the microchannel portion 12, at the level of the second side S2 of the portion 12, for simplicity of design and fabrication. Of course, more complex structures and liquid flow circuits may be provided, as exemplified in FIGS. 13-14, where the second region 122 is structured in several compartments 122*b*, 122*c*, each benefiting from a respective access to the air vent 40*b*, 40*c*. The embodiments of FIGS. 13, 14 are particularly advantageous for detection. These can be used, for example, in a receptorless assay. For example, one may place various substrates for enzymes in compartmentalized sections 122*b*, 122*c* of the second region 122 (or, in variants, use several channels 10), each compartment having one type of substrate. Reagents placed in the compartments can also be dyes, fluorophores, DNA probes, pH sensitive dye indicators, chelating reagents, ligands for metals and metallic complexes, beads functionalized with reagents, cells, polymers, and any other type of bio(chemical) generally useful for the detection of analytes. Such designs may in particular be suited for portable or mobile diagnostics such as smartphone-based diagnostics utilizing disposable microfluidic chip holding reagents. This will be discussed later in detail. Note that, in the embodiment of FIG. 14, excess liquid can be diverted through channel 40*c*, whence the absence of liquid stop in the left-hand side compartment 122*c*.

The liquid pump 15 (as symbolically depicted in FIG. 17) may comprise active liquid pumping means 15, which has proved to work particularly well in practice. Active liquid pumping means may, for example, include: a syringe (e.g., one may press a syringe by hand), a step motor, a peristaltic pump, a pressure-driven pump system, or a spinning plate for centrifugal acceleration of the liquid. In each of these examples, the active liquid means can be connected to a common source (such as source 10*i* in FIG. 17), using standard ports and tubing. In variants, the liquid pump 15 may comprise one or more passive capillary pumps, or even consist of one or more passive capillary pumps, e.g., large wetting areas provided downstream from the portion(s) 12.

Figure 16:
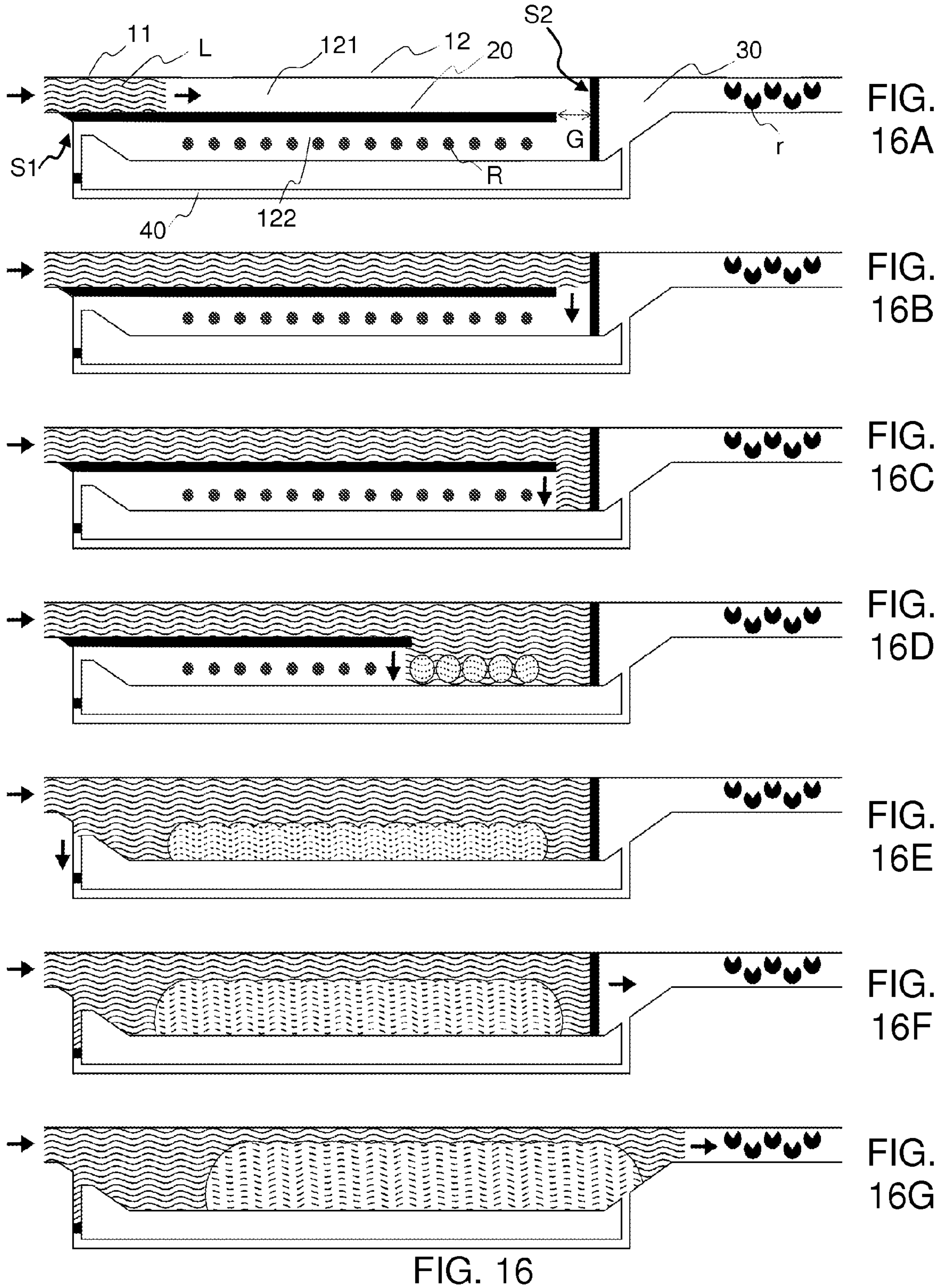
FIG. 16 (16A-16G) illustrate various steps of a method for controlling liquid in a device according to FIG. 10, and according to embodiments.

Referring now more particularly to FIGS. 15, 16: in embodiments, the device 1 may be provided with reagent, e.g., (bio) chemical reagents, already integrated in compartments or areas of the portion(s) 12. Also, receptors r could be provided downstream from the outlet 13, for them to react with liquid exiting the outlet 13, as illustrated in FIG. 16G. For instance, the second region 122 may comprise reagents R, R1, R2, which can be dissolved by liquid, and, in particular, by excess liquid flowing into the second region 122. Reagents shall typically be dissolved in a reasonably defined volume of liquid. Different reagents (R1, R2, R3, etc.) can also be spotted in the second region 122, for example at a few millimeters from each other, to maintain some degree of separation, notwithstanding their dissolution and passive diffusion profile. In other words, after dissolution of these reagents, the liquid passing the transverse liquid barrier will carry along the dissolved reagents in a well-defined sequence (e.g., 10 nL of liquid with reagent R1, followed by 5 nL of liquid without any reagent, followed by 20 nL of liquid with reagent R2). This well-defined dissolution of various reagents in a liquid is particularly suited for effecting (bio)chemical assays or analysis, which typically require exposing receptors to analytes and reagents in an appropriate sequence. In variants, one or several delay chambers 42 (as in FIG. 12) can be used to provide more time for dissolution of one or more reagents and/or for some reagents to react with analytes in the liquid. This may help enhance the sensitivity of an assay, for example, or can increase the yield of chemical reactions.

Note that in each of the embodiments of FIGS. 1, 10-17, the transverse section 13 of the liquid outlet is designed smaller than the average transverse section of the microchannel portion 12. This helps create a stronger concentration gradient of reagents along the transverse section 13, which increases diffusion of reagents. Also, in the specific embodiment of FIG. 15, the device 1 comprises a liquid diversion valve (embodied as a liquid constriction), whose tapered walls 30*b* act as transverse liquid barrier.

Referring now specifically to FIG. 16, and according to another aspect, the invention can be embodied as a method for controlling liquid L in a microfluidic device 1 such as described above. Basically, such a method comprises the following steps.

First, FIG. 16A, liquid L enters the first region 121 of the microchannel portion 12 via the liquid inlet 11, e.g., thanks to the liquid pump pushing (active means) or pulling (passive, wetting means) the liquid. Liquid L therefore advances, longitudinally, in the region 121, where it is held by the longitudinal barrier 20, up to the transverse barrier 30 (FIG. 16B). There, a meniscus forms and because of the slight capillary gap G, liquid gets pinned at the gap, so that liquid fills the first region 121.

Once a sufficient quantity of liquid L is present, pumping additional liquid will raise the pressure on the liquid giving sufficient energy to its air-liquid meniscus to stretch and pass the gap G (FIGS. 16B-C). Then, the liquid will continue its progression into the second region 122 and will induce flow of the liquid in the first region 121 transversally to the longitudinal barrier 20, FIG. 16D. It is important to note that excess liquid does essentially flow over the barrier 20 in the example of FIG. 16 (i.e., above the barrier and through the passage 22, see FIGS. 1-2). In other words, liquid flows essentially transversally (orthogonally to the rail 20 in FIGS. 16C-E), rather than longitudinally, via the gap G, such as to allow for an optimal mixing in the region 122. Because the liquid does not flow longitudinally, it does not dissolve and accumulate reagents. Rather, reagents dissolve locally and diffuse passively around the area where they were spotted.

Now, if a gap G is provided between the transverse and longitudinal barriers 20, 30, it remains that, because of liquid pinned at the gap G, liquid particles in the region S2 (at the level of the gap) will be the first to start flowing transversally to the longitudinal barrier (to fill the second region). Then, because liquid "prefers to wet" liquid, it may look like a liquid front is advancing from the second side S2 to the first side S1, when seen from above. However, this should not be interpreted as if liquid were advancing longitudinally from S2 to S1 in the second region. Rather, excess liquid happen to flow essentially transversally through (or above) the barrier 20.

As illustrated in FIG. 16, when reagents R are present, they shall start to gently dissolve and diffuse around, the transverse flow of excess liquid helping to distribute the liquid incrementally over the reagents (as opposed to a longitudinal flow that would accumulate reagents). At some point (FIG. 16G), the liquid has filled the whole portion 12 and cannot advance anymore, so that additional liquid entering the portion 12 shall force excess liquid to discharge into the liquid outlet 13, via the second passage(s) 32, e.g., by passing over the barrier 30 (arranged as a diversion rail in FIG. 16).

The vent 40 prevents trapping air in the portion 12 when liquid fills the second region 122. Trapped air would hinder the filling of the chamber and the operation of the device. However, owing to the compressibility of air, orthogonal flow mixing can in principle be contemplated without any air vent.

Referring now more particularly to FIG. 16G: in embodiments, a microchannel 10 may further comprise one or more receptors r downstream from the liquid outlet 13. Thus, when excess liquid discharged via the liquid outlet 13 will flood and react with said receptors. Such receptors may for example bind analytes in a liquid sample flowing through the portion 12 and reagents spotted in the second region 122. The position of the reagents along the second region 122 will for instance determine in which volume fraction of the liquid sample and at what time the reagents will successively pass the outlet 13 and interact with analytes bound to receptors r, so as to permit the detection of analytes in the liquid sample.

As described earlier in reference to FIGS. 13, 14, one can nevertheless contemplate assays to be performed without using any receptor downstream from the portion 12. In some assays, a reagent for an enzyme analyte can be spotted in the second region 12. The enzyme will convert the substrate into a colored product. The application can for example be the detection of liver toxicity, a common condition, in which hepatocytes break down and release enzymes in the blood of patients. The detection of these enzymes is useful. Liver toxicity can arise from anti-HIV treatments and toxicity induced by many drugs. In that respect, embodiments of the invention can be used to perform similar tests, together with imaging of the enzymatic products, e.g., using a smartphone. Of particular advantage is to use a device 1 molded in plastic. As mentioned earlier, one may even contemplate placing various substrates for enzymes in compartmentalized sections 122*b*, 122*c* (FIGS. 13, 14) of the second region 122, or, in variants, use several mixing chambers 12 in parallel, each having one respective type of substrate for a specific enzyme or analyte.

Referring back to FIG. 15 or 16: it is worth mentioning that reagents of different types may be spotted in one or more of the following ways. A first way is to spot a reagent of a second type on top of a reagent of a first type. Another way is to spot reagents of a first type R1 in a first area (e.g., an area proximate inlet end of device) of the second region 122 and reagents of a second type R2 in a second area (e.g., an area proximate outlet end of device) of the second region 122. Said areas may extend in-line along the longitudinal barrier 20, as illustrated in FIG. 15.

Figure 17:
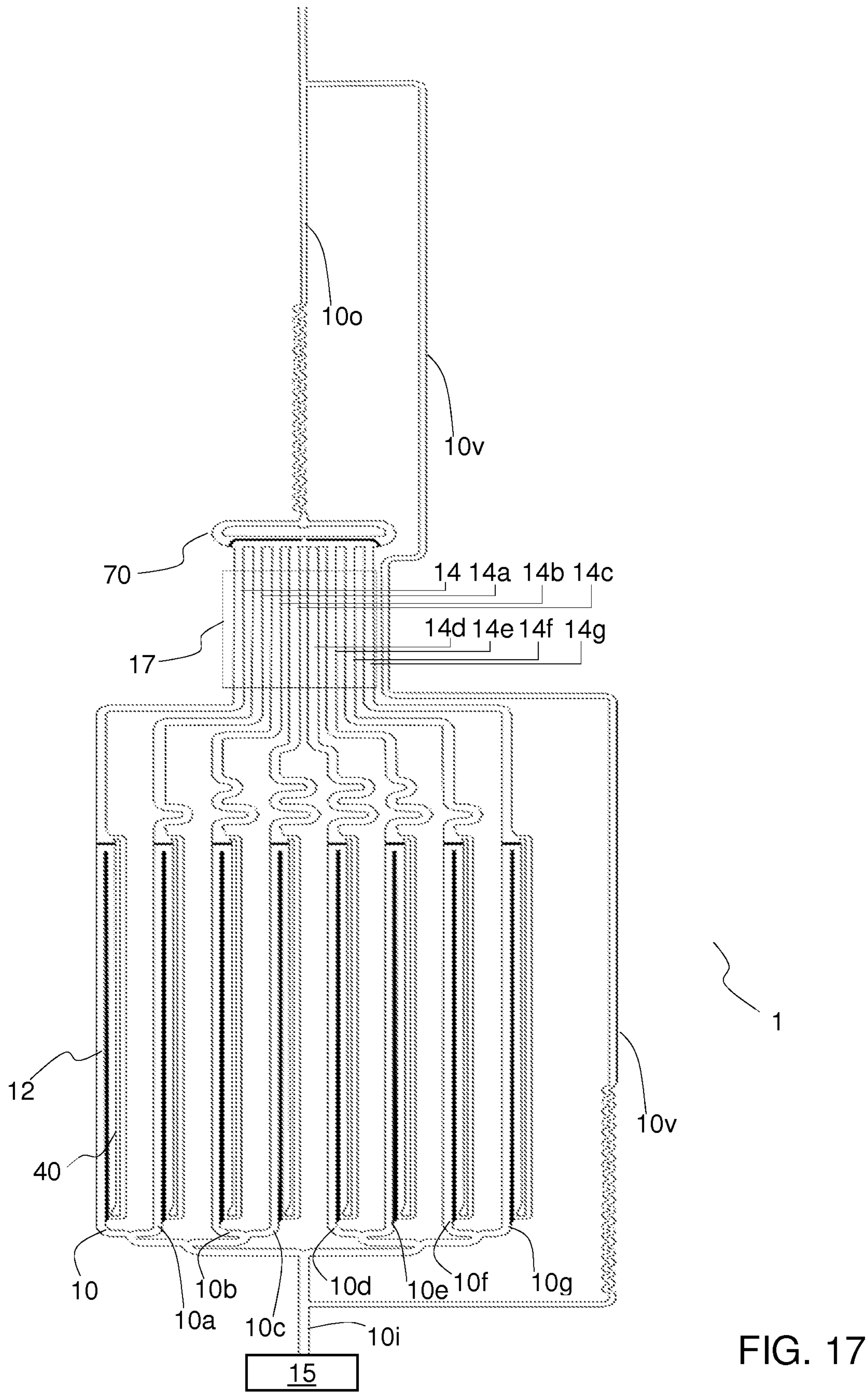
FIG. 17 is a top view of a simplified representation of multiplexed device, involving several, multiplexed microchannels, together with a liquid synchronization junction, according to embodiments.

Referring now to FIG. 17: in embodiments, the present devices 1 may comprise several microchannels 10, arranged in a multiplexed fashion. In the context of FIG. 17, multiplexed channels 10 have a common source 10*i*, subdividing into several channels 10, 10*a-g* to feed respective mixing chambers 12. Of particular advantage is the fact that the preferred air vent designs allow for easily multiplexing the channel portions 12. Detection areas may be provided downstream from the portions 12, if necessary. Such detection areas can be implemented using detection channels 14, 14*a-g*. A reaction between an analyte in a sample and one or more reagents in a channel portion 12 can be used to create a colored product indicative of the presence and concentration of the analyte in the solution. Alternatively, a colored analyte might be detected in a detection channel by reaction with a reagent that suppresses or modifies the color of the analyte. Such analyte-reagent means of detection are standard in biochemistry and biology and can employ optical, fluorescence, electrical (resistance, capacitance, impedance, or generation of current) signals. There is also the possibility to place, e.g., by means of inkjet-based spotting, a receptor in a detection channel. This receptor can for example be a "capture" antibody immobilized on the surface of a detection channel. It can also be a capture antibody located at the surface of a micro/nanosphere. In this example, a surface "sandwich" immunoassay can be implemented for detecting an antigen (i.e., the analyte) in a solution filling the device 1. The reagent deposited in the channel portion 12 should then be a "detection" antibody, preferably, but not necessarily, labelled with a fluorescent dye. The controlled release of the detection antibody in the channel portion 12 will lead to the formation of analyte-detection antibody complexes, which can in turn be captured in the downstream detection channel 14, 14*a-g* by capture antibodies. The amount of fluorescence measured on the capture area 17 will reveal the presence and concentration of analyte in the sample. The types and amounts of reagents and receptors used for detecting analytes can be greatly varied and adapted to the type of analytes and sample employed. The detection of analytes using such ligand/receptors specific interactions is well known and can comprise test for detecting chemicals, proteins, oligonucleotides, cells, pollutants, pathogens, and metals, for example. The use of several channel portions 12 and detection channels 14, 14*a-g* permit the realization of multiplexed tests on a single device. For multiplexed tests, the channel portions 12 and detection channels 14, 14*a-g* are preferably parallel and also preferably regularly spaced from each other to facilitate the deposition of reagents in the channel portions 12 and of receptors in the detection channels 14, 14*a-g*. Parallelism of and reduced spacing between detection channels 14, 14*a-g* permit to reduce the footprint of the detection area 17. This helps reduce the overall dimensions and cost of the device 1 but also reduces the requirements of signal measuring devices such as CCD chips, CMOS chips, optical/fluorescence scanners, microscopes. Compact detection areas are particularly desirable for imaging detection channels all at once using a small form factor lens and a smartphone, for example. Since channel portions 12 may need to be significantly larger than detection channels 14, 14*a-g* for dissolving reagents in sufficiently large volumes of samples, it is unlikely that channel portions and detection channels can be aligned. In fact, present inventors noticed, when fabricating various versions of a device such as depicted in FIG. 17, that channel portions tend to represent approximately 50% of the entire footprint of device 1. For this reason, it may be appropriate to provide connection channels to link individual channel portions 12 to detection channels 14, 14*a-g*. These connection channels should preferably all have the same length so that they all have equal hydraulic resistance and do not bias one channel to receive more sample than another one. Making some connection channels meandering (as depicted in FIG. 17, between the channel portions 12 and detection area 17) can be used to equalize the lengths of the connection channels. Alternatively, their widths can be adjusted to equalize their hydraulic resistance. In practice, meanders are preferred because they enable further transverse mixing. Such meandering are often referred to as "Dean flow mixers" and the number of meanders and radius of curvatures can be adapted depending on how much mixing along the crossection of the channel is desired. Another consideration when using a microfluidic device for (bio)chemical analysis is the difficulty to fill the device with a precise volume of sample. If a device is filled with different volumes of sample for each test, dissolved reagents might not always be positioned at the right place in a detection channel. In undesired scenarios, passing too large volumes of sample may flush reagents, and potentially also receptors, outside detection areas. This can lead to inaccurate tests or tests with false negative results.

This situation can be significantly improved by adding channel 10*v*, which bypasses the array of channel portions 12, connection channels (if any) detection channels 14, 14*a-g*, and the synchronization junction 70 (see below). Channel 10*v* starts with a region having a relatively high hydraulic resistance (narrow and long meandering channel). This hydraulic resistance should be higher than the overall resistance of the array of channel portions 12, connection channels (if any), the detection channels 14, 14*a-g*, and the synchronization junction 70, to favor filling of these structures and to minimize filling of channel 10*v*. Then, a channel 10*o* with a hydraulic resistance larger than in channel 10*v* should be present after the synchronization junction 70. Liquid arriving in channel 10*o* will experience a strong resistance to flow and flow will mostly occur via channel 10*v*, thereby minimizing unnecessary flow through the detection channels and keeping in this strategic part of the device reagents and receptors.

Figure 18:
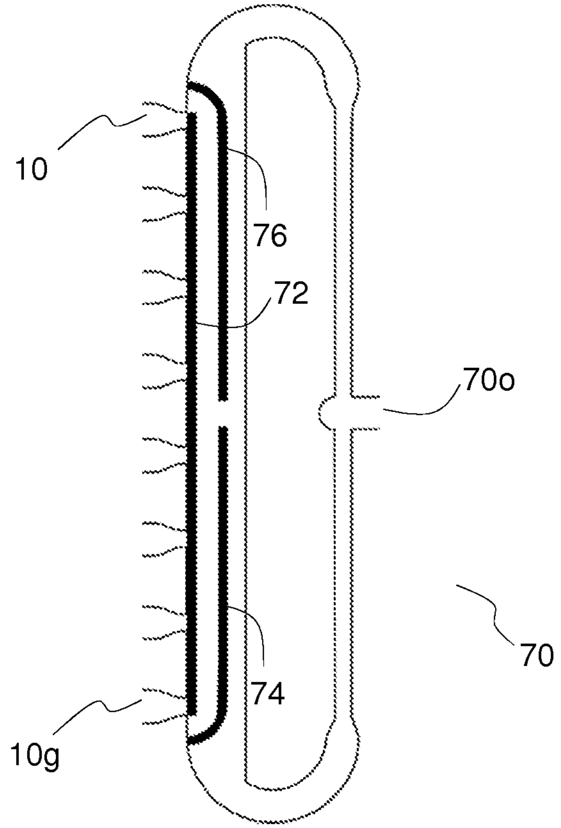
FIG. 18 is a top view of a simplified representation of a liquid synchronization junction such as involved in the embodiment of FIG. 17, showing more details of the junction.

In the embodiments of FIGS. 17 and 18, the multiplexed device 1 further comprises a liquid synchronization junction 70, located downstream from each of the microchannels 10, 10*a-g*, and configured to synchronize flows of liquid conveyed in the microchannels, downstream from respective microchannel portions 12 thereof. The synchronization junction comprises liquid barriers 74, 76 extending longitudinally therein (yet transversally with respect to the incoming flow direction), and arranged to delay propagation of liquid entering the junction 70. Note that, in FIG. 17, all channels 10, 10*a-g* merge at the level of a junction, a thing that is advantageous to ensure that similar flow rates and volumes of liquid can pass through the respective flow mixing chambers 12. In that sense, a synchronization junction is complementary to the mixing chamber concept disclosed herein.

Many variants can be contemplated for the junction 70. In detail, in the embodiment of FIG. 18: the rail 72 is a supporting rail (optional). Rails 74 and 76 are liquid retention rails, which together with the supporting rail 72 (or any inner wall of the junction playing the same role) serve to retain and merge liquid arriving from the channels 10, 10*a-g*. A gap is provided between the two rails 74, 76, to release excess liquid, following similar principles as described earlier. Liquid released will then exit the junction via the outlet 70*o* to flow into channel 10*o* (FIG. 17).

Liquid coming from separate channels 10, 10*a-g* approaches the junction 70 at respective inlets. Note that the inlets at stake have capillary valves (here provided as liquid constrictions, FIG. 18). Consecutively, the filling front from individual channels line up. When pressure builds up sufficiently high, liquid at one inlet, or multiple inlets, can break the surface tension of the liquid and proceed to fill the junction 70. The retention rail 74, 76 shall then confine the initial phase of filling to one or each of the inflow merging areas (between rail 72 and rails 74, 76), thereby eliminating the risk of air entrapment. Liquid flow through other inlets starts when the liquid in the inflow merging areas makes contact with the filling fronts stalled at other inlet capillary valves. The release port, i.e., the gap between the two rails 74, 76 coordinates a controlled mediolateral flow from inlets to the outlet 70*o*, against air entrapment. Resistive elements and outlet capillary valves may be provided to help the junction 70 to fill completely. Although optional, the supporting rail 72 helps to consolidate the inlet capillary valves.

The above embodiments have been succinctly described in reference to the accompanying drawings and may accommodate a number of variants. Several combinations of the above features may be contemplated. For example: (i) One or more air vents may (or may not) be present; (ii) The air vent may connects the second region at a location close to the liquid inlet (for maximizing air evacuation), to the outlet; (iii) Several delay chambers may be provided, each having a respective access to an air vent or connecting to a respective air vent; (iv) An air vent may comprise an air permeable liquid barrier, or not; (v) A microfluidic device 1 may, in embodiments, comprises liquid barriers 20, 30, 44, 74, 76 of different types, e.g., selected from the types shown in FIGS. 2-9. Even a single barrier 20, 30, etc. may be composed of barrier elements of different types.

Note that, in any of the particular contexts discussed in items (i)-(v) above: (vi) The transverse barrier 30 may be at a capillary distance from the longitudinal barrier 20; (vii) The transverse barrier 30 shall preferably extend perpendicularly to the longitudinal barrier 20; (viii) The longitudinal barrier 20 may extend longitudinally, and across substantially a whole length of the portion 12; (ix) The transverse barrier 30 may extends across substantially the whole width of the portion 12, between the longitudinal liquid barrier and the liquid outlet, especially in the context discussed in item (viii) above; (x) Liquid pump may be active liquid pumping means, or alternatively passive means, in any of the contexts discussed in items (i)-(ix) above;

In addition, and in any of the particular contexts discussed in items (i)-(x) above: (xi) the second region may comprise dilutable reagents;

In addition, and in any of the particular contexts discussed in items (i)-(xi) above, a transverse section of the liquid outlet may be smaller than a transverse section of the portion 12; and (xiii) A multiplexed device such as depicted in FIG. 17 may in fact comprise several channels 10 and channel portions 12 designed according to any of the items (i) to (xii) above, if necessary with a liquid synchronization junction 70 such as discussed earlier.

Other variants and combinations of features may be provided, some of which are implicit from the drawings.

Some of the methods and features described herein can be used in the fabrication of microfluidic chips. The resulting chips can be distributed by the fabricator in raw wafer form (that is, as a single wafer that has multiple unpackaged chips), as a bare die, or in a packaged form. In the latter case the chip may be mounted in a single chip package or in a multichip package. In any case the chip may then be integrated with other chips. Similarly, microfluidic chips can be made in glass or polymers or using a combination of materials. Chips in glass might be fabricated using lithography and dry or wet etching methods. Chips in polymer can be produced using hot embossing or injection molding or also using roll-to-roll manufacturing methods using flexible materials.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, additional elements may be present, such as valves, ports, vias, tubing ports, etc.

REFERENCE LIST

1 Microfluidic device
10 Microchannels
11 Liquid inlet
12 Microchannel portion (flow mixing chamber)
121 First region of the flow mixing chamber
122 Second region of the flow mixing chamber
13 Liquid outlet
14 Detection channels
15 Liquid pump
17 Detection area
20 Longitudinal liquid barrier
22 First liquid passages (at the level of the longitudinal barrier)
30 Transverse liquid barrier
32 Second liquid passages
40 Air vent
42 Delay chamber
44 Air permeable liquid barrier
50 Bottom wall of the chamber
70 Synchronization junction
70*o* Junction outlet
72 Supporting rail
74, 76 Liquid retention rails
R Reagents
R Receptors

The invention claimed is:

1. A microfluidic device comprising a set of one or more microchannels, each microchannel comprising:

a microchannel portion with a longitudinal liquid barrier extending longitudinally therein, thereby defining a first region and a second region in the microchannel portion;

one or more first liquid passages, at the level of the longitudinal liquid barrier;

a liquid inlet, configured to allow liquid to enter the first region;

a liquid outlet, configured to allow liquid to leave the microchannel portion;

a transverse liquid barrier arranged between the microchannel portion and the liquid outlet to hold liquid flowed from the liquid inlet in the first region, in operation; and one or more second liquid passages at the level of the transverse liquid barrier, the device further comprising a liquid pump configured to displace liquid through each microchannel portion of the set of one or more microchannels, wherein, the one or more first liquid passages are configured so as to allow, in operation, excess liquid in the first region to flow into the second region, transversally to the longitudinal liquid barrier, and the one or more second liquid passages are configured so as to allow, in operation, excess liquid in the microchannel portion to be discharged via the liquid outlet, the device further comprising an air vent connecting to the second region and configured so as to evacuate air therefrom, when liquid fills the second region, in operation, wherein the air vent connects the second region to the liquid outlet.

2. The device of claim 1, wherein the air vent connects to the second region at a location close enough to the liquid inlet for the air vent to be able to evacuate air from the microchannel portion when liquid has substantially filled the second region, in operation.

3. The device of claim 2, wherein the air vent connects to the second region via a delay chamber, the latter configured so as to be fillable by excess liquid supplied via the liquid inlet after the microchannel portion has been filled with liquid, in operation.

4. The device of claim 1, wherein the air vent comprises an air permeable liquid barrier, configured for blocking a liquid entering the air vent.

5. The device of claim 1, wherein the longitudinal liquid barrier comprises one of:

an elongated, raised structure protruding from a bottom wall of the microchannel portion, whose height is less than a depth of the microchannel portion, thereby defining a liquid passage above the raised structure, allowing an excess liquid in the first region to flow from the first region to the second region, in operation;

a set of aligned, raised structures, each protruding from a bottom wall of the microchannel portion, wherein a space between two consecutive structures of the set forms a capillary liquid passage, the latter allowing pressurized liquid in the first region to flow to the second region, in operation;

a monobloc, raised structure, protruding from a bottom wall of the microchannel portion, and exhibiting crenels that form liquid passages, which allow pressurized liquid in the first region to flow from the first region to the second region, in operation;

a set of one or more recesses, each provided in a thickness of a bottom wall of the microchannel portion, and allowing pressurized liquid in the first region to flow from the first region to the second region, in operation; and a non-wetting surface.

6. The device of claim 1, wherein the transverse liquid barrier is at a capillary distance from the longitudinal liquid barrier, so as to prompt excess liquid in the first region to flow into the second region rather than exit the microchannel portion via the one or more second liquid passages, and wherein the transverse liquid barrier extends perpendicularly to the longitudinal liquid barrier.

7. The device of claim 6, wherein the longitudinal liquid barrier extends longitudinally, and across substantially a whole length of the microchannel portion and the transverse liquid barrier extends transversally and across substantially a whole width of the microchannel portion, between the longitudinal liquid barrier and the liquid outlet.

8. The device of claim 1, wherein the liquid pump includes active liquid pumping means.

9. The device of claim 1, wherein the second region comprises reagents, the latter dilutable by liquid flowing from the first region into the second region.

10. The device of claim 1, wherein the set of one or more microchannels comprises at least two microchannels, which are arranged in a multiplexed fashion.

11. The device of claim 10, further comprising a liquid synchronization junction downstream from each of said two or more microchannels, configured to synchronize flows of liquid conveyed in said two or more microchannels, downstream from respective microchannel portions thereof, wherein the synchronization junction comprises one or more liquid barriers, extending longitudinally therein, arranged to delay propagation of liquid entering the synchronization junction.

12. The device of claim 1, wherein, for one or more of the microchannels of the set, a transverse section of the liquid outlet is smaller than a transverse section of said microchannel portion.

13. The device of claim 1, further comprising a transverse, raised structure exhibiting said transverse liquid barrier.

14. The device of claim 1, further comprising a liquid diversion valve, the transverse liquid barrier forming part of this valve.

15. A microfluidic device comprising a set of one or more microchannels, each microchannel comprising:

a microchannel portion with a longitudinal liquid barrier extending longitudinally therein, thereby defining a first region and a second region in the microchannel portion;

one or more first liquid passages, at the level of the longitudinal liquid barrier;

a liquid inlet on a first side of the microchannel portion, configured to allow liquid to enter the first region;

a liquid outlet on a second side of the microchannel portion, opposite to the first side, configured to allow liquid to leave the microchannel portion;

a transverse liquid barrier arranged between the microchannel portion and the liquid outlet to hold liquid flowed from the liquid inlet in the first region, in operation; and one or more second liquid passages at the level of the transverse liquid barrier, the device further comprising a liquid pump configured to displace liquid through each microchannel portion of the set of one or more microchannels, wherein, the one or more first liquid passages are configured so as to allow, in operation, excess liquid in the first region to flow into the second region, transversally to the longitudinal liquid barrier, and the one or more second liquid passages are configured so as to allow, in operation, excess liquid in the microchannel portion to be discharged via the liquid outlet, and wherein the transverse liquid barrier is at a capillary distance from the longitudinal liquid barrier, so as to prompt excess liquid in the first region to flow into the second region rather than exit the microchannel portion via the one or more second liquid passages.

16. The device of claim 15, wherein the device further comprises an air vent connecting the second region to the liquid outlet and configured so as to evacuate air therefrom, when liquid fills the second region, in operation.

17. The device of claim 16, wherein the air vent connects to the second region at a location close enough to the liquid inlet for the air vent to be able to evacuate air from the microchannel portion when liquid has substantially filled the second region, in operation.

18. A method for controlling liquid in the microfluidic device, comprising:

letting liquid enter a first region of a microchannel portion via a liquid inlet of the microfluidic device, wherein the letting liquid enter the first region is facilitated by a liquid pump, and wherein the microfluidic device comprises:

the microchannel portion, the microchannel portion including a longitudinal liquid barrier extending longitudinally therein, thereby defining the first region and a second region in the microchannel portion;

one or more first liquid passages, at the level of the longitudinal liquid barrier;

the liquid inlet, configured to allow liquid to enter the first region;

a liquid outlet, configured to allow liquid to leave the microchannel portion;

a transverse liquid barrier arranged between the microchannel portion and the liquid outlet to hold liquid flowed from the liquid inlet in the first region, in operation; and one or more second liquid passages at the level of the transverse liquid barrier, the liquid pump configured to displace liquid through each microchannel portion of the set of one or more microchannels, wherein, the one or more first liquid passages are configured so as to allow, in operation, excess liquid in the first region to flow into the second region, transversally to the longitudinal liquid barrier, and the one or more second liquid passages are configured so as to allow, in operation, excess liquid in the microchannel portion to be discharged via the liquid outlet;

letting liquid that has entered the first region fill the first region, the liquid being held by the transverse liquid barrier;

letting excess liquid in the first region flow into the second region, transversally to the longitudinal liquid barrier, via the one or more first passages;

letting excess liquid flow into the second region transversally to the longitudinal liquid barrier so as to fill the second region from a second side of the microchannel portion, near the liquid outlet, to a first side of the microchannel portion, near the liquid inlet; and letting excess liquid in the microchannel portion discharge into the liquid outlet, via the one or more second passages.

19. The method of claim 18, wherein the second region comprises reagents, the latter dilutable by excess liquid flowing from the first region into the second region, such that letting excess liquid flow into the second region via the one or more first liquid passages causes to dissolve the reagents.

20. The method of claim 19, wherein the second region comprises reagents of different types, the latter spotted in one or more of the following ways:

a reagent of a second type is spotted on top of a reagent of a first type; and a reagent of a first type is spotted in a first area of the second region and a reagent of a second type is spotted in a second area of the second region, said first and the second areas extending, in-line, along the longitudinal liquid barrier.

21. The method of claim 19, wherein at least one microchannel of said set of one or more microchannels further comprises one or more receptors downstream from the liquid outlet, and wherein letting excess liquid discharge into the liquid outlet comprises letting the discharged excess liquid react with said one or more receptors.

* * * * *